US012669569B2

(12) United States Patent
Ji et al.

(10) Patent No.: US 12,669,569 B2
(45) Date of Patent: Jun. 30, 2026

(54) METHOD OF GENERATING DIRECTION VECTOR OF PARTICLE, AND APPARATUS AND METHOD FOR ESTIMATING INDOOR LOCATION BASED THEREON

(71) Applicant: Electronics and Telecommunications Research Institute, Daejeon (KR)

(72) Inventors: Myung In Ji, Daejeon (KR); Ju Il Jeon, Daejeon (KR); Young Su Cho, Daejeon (KR); Kyeong Soo Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 392 days.

(21) Appl. No.: 18/470,956

(22) Filed: Sep. 20, 2023

(65) Prior Publication Data

US 2024/0175971 A1     May 30, 2024

(30) Foreign Application Priority Data

Nov. 29, 2022     (KR) ........................ 10-2022-0163392

(51) Int. Cl.
G01S 5/02 (2010.01)

(52) U.S. Cl.
CPC ........ G01S 5/02521 (2020.05); G01S 5/0294 (2013.01); *G01S 5/02522* (2020.05); *G01S 5/02525* (2020.05); *G01S 5/02526* (2020.05)

(58) Field of Classification Search
CPC .............. G01S 5/02521; G01S 5/0294; G01S 5/02525; G01S 5/02526; G01S 2205/02
USPC ................................................ 342/450, 451
See application file for complete search history.

(56) References Cited

U.S. PATENT DOCUMENTS

| | | | | |
|---|---|---|---|---|
| 7,664,511 B2* | 2/2010 | Wang | ................... | H04W 64/00 |
| | | | | 455/456.2 |
| 9,936,356 B2* | 4/2018 | Jeong | ...................... | H04W 4/80 |
| 10,028,100 B2* | 7/2018 | Abadi | ..................... | H04W 4/33 |
| 10,123,176 B2 | 11/2018 | Cho et al. | | |
| 10,241,189 B2* | 3/2019 | Wirola | ................ | G01S 5/02524 |
| 10,267,893 B2* | 4/2019 | Gonia | ........................ | G01S 5/14 |
| 10,349,242 B2* | 7/2019 | Narasimhan | ............ | H04W 4/33 |
| 10,390,179 B2 | 8/2019 | Ji et al. | | |
| 10,794,986 B2* | 10/2020 | Bhatti | ................... | G01S 5/0264 |
| 10,871,547 B1 | 12/2020 | Patel et al. | | |
| 11,290,850 B2* | 3/2022 | Jeong | ..................... | H04W 4/029 |
| 2007/0149216 A1* | 6/2007 | Misikangas | ......... | G01S 5/02524 |
| | | | | 455/456.1 |

(Continued)

FOREIGN PATENT DOCUMENTS

| | | |
|---|---|---|
| KR | 10-1675759 | 11/2016 |
| KR | 10-2136111 | 7/2020 |

(Continued)

*Primary Examiner* — Chuong P Nguyen
(74) *Attorney, Agent, or Firm* — KILE PARK REED & HOUTTEMAN PLLC

(57) ABSTRACT

Provided is a method of generating direction vectors of particles. The method includes calculating, by a processor, a center of gravity of the particles on the basis of characteristic values of one or more particles in a cluster including the particles, and generating, by the processor, direction vectors of the particles on the basis of the center of gravity.

15 Claims, 12 Drawing Sheets

(56) References Cited

U.S. PATENT DOCUMENTS

| | | | | |
|---|---|---|---|---|
| 2015/0080020 A1* | 3/2015 | Edge | H04W 24/10 | |
| | | | | 455/456.1 |
| 2016/0139239 A1* | 5/2016 | Thiagarajan | H04W 64/00 | |
| | | | | 455/456.1 |
| 2016/0371394 A1* | 12/2016 | Shahidi | H04W 4/029 | |
| 2017/0248428 A1* | 8/2017 | Cho | H04W 4/026 | |

FOREIGN PATENT DOCUMENTS

| | | | | | |
|---|---|---|---|---|---|
| KR | 20200140184 A | * | 12/2020 | | H04W 64/00 |
| KR | 10-2362817 | | 2/2022 | | |
| KR | 10-2386226 | | 4/2022 | | |
| KR | 10-2412322 | | 6/2022 | | |
| KR | 20230113884 A | * | 8/2023 | | G01S 5/02525 |
| WO | WO-2017220643 A1 | * | 12/2017 | | G01S 5/021 |

* cited by examiner

METHOD OF GENERATING DIRECTION VECTOR OF PARTICLE, AND APPARATUS AND METHOD FOR ESTIMATING INDOOR LOCATION BASED THEREON

CROSS-REFERENCE TO RELATED APPLICATION

This application claims priority to and the benefit of Korean Patent Application No. 10-2022-0163392, filed on Nov. 29, 2022, the disclosure of which is incorporated herein by reference in its entirety.

BACKGROUND

1. Field of the Invention

The present invention relates to a technique for estimating an indoor location, and more specifically, to an apparatus and method for estimating an indoor location based on a particle filter.

2. Discussion of Related Art

Generally, a particle filter estimates an accurate location of a terminal in a wireless communication environment having a non-constant reception signal strength distribution even at the same point due to multipath fading.

A particle filter allows particles to be placed at various random points within a service area, compares the similarity between positioning infrastructure measurement values and a radio map database (DB) which is referred to by the particles, divides particles with high similarity into two or more particles near the corresponding location, destroys particles with low similarity, and estimates a location of a terminal through weighted sum of similarities of the final remaining particles.

A conventional particle filter estimates a location of an object by appropriately applying a measurement update step in which particles are divided or destroyed through similarity evaluation using measurement values, and a time update step in which the movement of the object is predicted and all the particles move.

In particular, when a particle filter is used for a non-moving object, the particle filter skips the time update step and applies only the measurement update step. In this case, since the particles move in an arbitrary direction, there is a problem in that the efficiency is lowered and much time is required for convergence.

The related art of the present invention is disclosed in "Method of re-extracting particle for a particle filter" of Korean Laid-open Patent Publication No. 10-2136111 (Published on Jul. 15, 2020).

SUMMARY OF THE INVENTION

The present invention is directed to providing a method of generating direction vectors of particles, in which an indoor location is accurately and effectively estimated, and an apparatus and method for estimating an indoor location based thereon.

According to an aspect of the present invention, there is provided a method of generating direction vectors of particles, which includes calculating, by a processor, a center of gravity of the particles on the basis of characteristic values of one or more particles in a cluster including the particles, and generating, by the processor, direction vectors of the particles on the basis of the center of gravity.

The characteristic values may include similarities between positioning infrastructure measurement values and a radio map database (DB) which is referred to by the particles.

In the calculating of the center of gravity of the particles, the processor may calculate the center of gravity by performing a weighted sum on the similarities.

In the generating of the direction vectors of the particles, the processor may calculate the direction vectors on the basis of directions of the particles with respect to the center of gravity.

In the generating of the direction vectors of the particles, the processor may obtain the direction vectors of the particles by summing the direction vectors of the particles and direction vectors calculated from at least one cluster.

In the generating of the direction vectors of the particles, when the particle has a plurality of direction vectors, the processor may sum the plurality of direction vectors.

The method may further include, in the generating of the direction vectors of the particles, calculating, by the processor, a magnitude of a displacement to which the particle should be moved using a maximum value of the similarities of the particles in the cluster and using the similarities of the particles.

According to another aspect of the present invention, there is provided an apparatus for estimating an indoor location, which includes an interface unit configured to receive a positioning infrastructure measurement value and a radio map DB which is referred to by one or more particles in a cluster including the particles, and a processor configured to calculate characteristic values of the particles on the basis of the positioning infrastructure measurement values and the radio map DB which is referred to by the particles, calculate a center of gravity of the particles using the characteristic values, calculate direction vectors of the particles on the basis of the center of gravity, and then estimate an indoor location of a terminal by performing resampling on the particle according to the direction vector of each particle.

The characteristic values may include similarities between the positioning infrastructure measurement values and the radio map DB which is referred to by the particles.

The processor may determine moving directions of the particles according to the direction vectors of the particles when the particles are moved or divided.

The processor may determine moving distances of the particles according to a magnitude of a displacement of movement in which the particles are moved or divided.

According to still another aspect of the present invention, there is provided a method of estimating an indoor location, which includes receiving, by an interface unit, positioning infrastructure measurement values and a radio map DB which is referred to by a plurality of particles in a cluster including the particles, calculating, by a processor, characteristic values of the particles on the basis of the positioning infrastructure measurement values and the radio map DB which is referred to by the particles, calculating a center of gravity of the particles using the characteristic values, and calculating direction vectors of the particles on the basis of the center of gravity, and estimating, by the processor, an indoor location of a terminal by performing resampling on the particle according to the direction vector of each particle.

The characteristic values may include similarities between the positioning infrastructure measurement values and the radio map DB which is referred to by the particles.

In the estimating of the indoor location of the terminal, the processor may determine moving directions of the particles according to the direction vectors of the particles when the particles are moved or divided.

In the estimating of the indoor location of the terminal, the processor may determine moving distances of the particles according to a magnitude of a displacement of movement in which the particles are moved or divided.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
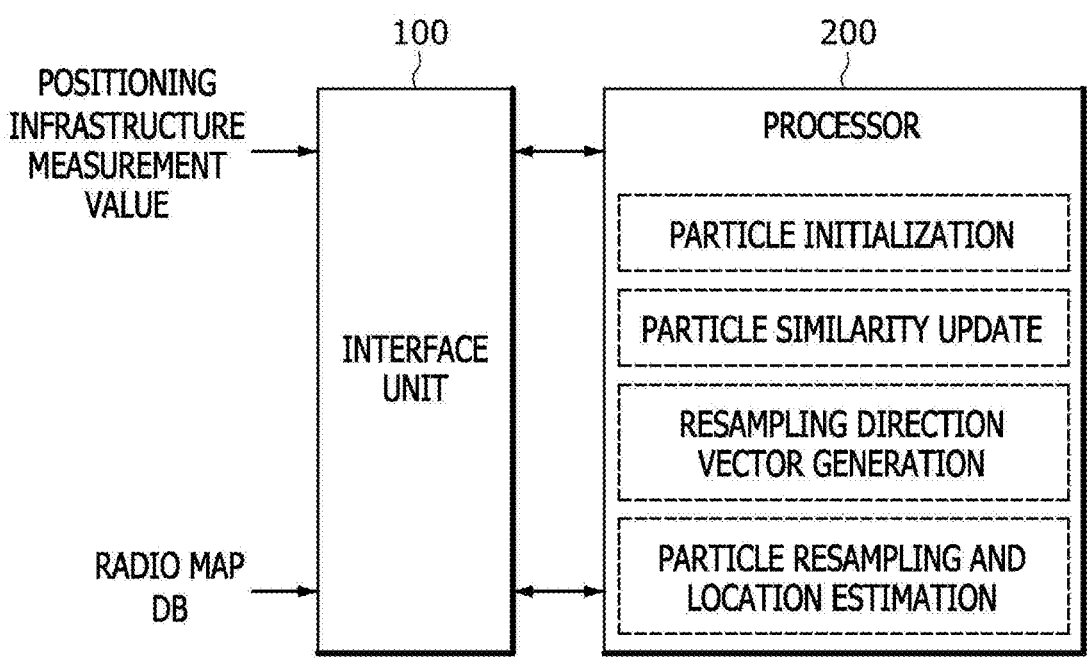
FIG. 1 is a block diagram of an apparatus for estimating an indoor location according to an embodiment of the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, embodiments of a method of generating direction vectors of particles according to an embodiment of the present invention and an apparatus and method for estimating an indoor location based thereon will be described. In this process, thicknesses of lines, sizes of components, and the like shown in the accompanying drawings may be exaggerated for clarity and convenience of description. Further, some terms which will be described below are defined in consideration of functions in the present invention and meanings may vary depending on, for example, a user or operator's intentions or customs. Therefore, the meanings of these terms should be interpreted based on the scope throughout this specification.

FIG. 1 is a block diagram of an apparatus for estimating an indoor location according to an embodiment of the present invention.

Referring to FIG. 1, the apparatus for estimating the indoor location according to the embodiment of the present invention includes an interface unit 100 and a processor 200.

The interface unit 100 collects positioning infrastructure measurement values within a service area from a terminal.

Further, the interface unit 100 collects a radio map database (DB).

The radio map DB includes information such as base station information and signal strength received from a plurality of preset reference locations within a service area, various types of statistical information, and the like.

Generally, since a Wi-Fi access point (AP) is easily installed, removed, or moved, a digital map DB may also be updated over time. Therefore, the processor 200 receives and updates a new radio map DB according to whether the radio map DB is updated.

The processor 200 uses a particle filter to estimate an accurate location of a terminal in a wireless communication environment having a non-constant reception signal strength distribution even at the same point due to multipath fading.

The particle filter allows particles 320 to be placed at various random points within the service area and evaluates similarities between the positioning infrastructure measurement values and the radio map DB which is referred to by the particles 320.

Referring to FIGS. 4 to 12, according to the similarities between the positioning infrastructure measurement values and the radio map DB which is referred to by the particles 320, the processor 200 divides the particles 320 into two or more particles or destroys the particles 320 and estimates a location of the terminal through weighted summing of similarities of the final remaining particles 320. That is, the particle filter estimates a location of an object by appropriately applying a measurement update step in which the particles 320 are divided or destroyed through similarity evaluation by using measurement values, and a time update step in which the movement of the object is predicted to move all the particles 320.

In this case, in the case in which a terminal is in a stationary state or information on a moving direction of the terminal cannot be obtained, the processor 200 calculates direction vectors of the particles 320 and performs resampling on the corresponding particle 320 according to the direction vector of each particle 320 to estimate an indoor location of the terminal.

Hereinafter, a method of estimating an indoor location according to an embodiment of the present invention will be described in detail with reference to FIGS. 2 to 12.

Figure 2:
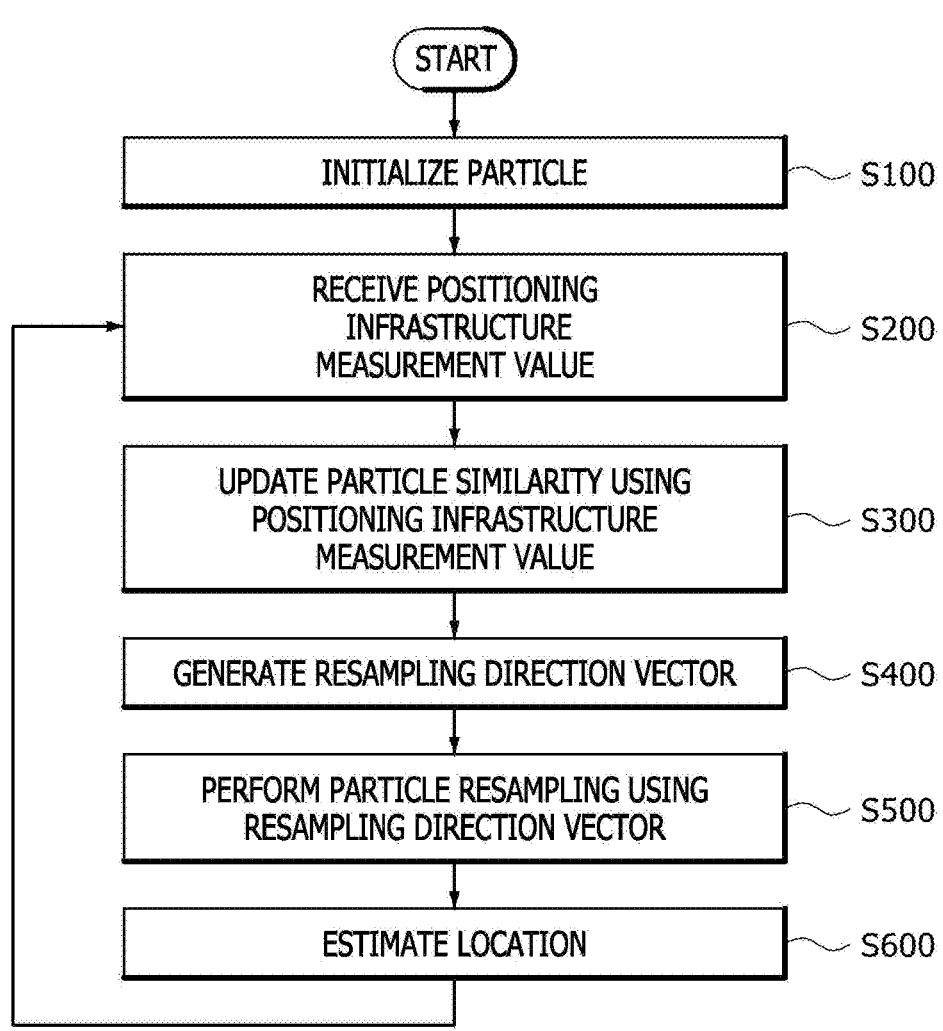
FIG. 2 is a flowchart of a method of estimating an indoor location according to an embodiment of the present invention.

FIG. 2 is a flowchart of a method of estimating an indoor location according to an embodiment of the present invention.

Referring to FIG. 2, first, a processor 200 initializes particles 320 at N random points where a user can be located (S100). That is, the processor 200 sets an area 310 which is a target for generating a direction vector. One or more particles 320 form a cluster in the area 310. The area 310 may be all or part of a service area.

The processor 200 collects positioning infrastructure measurement values within a service area from a terminal through an interface unit 100 (S200).

The processor 200 receives a radio map DB. The processor 200 may receive and store the radio map DB in advance and update the radio map DB in real time.

The processor 200 evaluates and updates a similarity between the positioning infrastructure measurement value and the radio map DB which is referred to by each particle 320 (S300).

As a method of evaluating a similarity, a method of using the Jaccard coefficient may be used. However, the method of evaluating the similarity is not particularly limited thereto.

When the evaluation of the similarities between the positioning infrastructure measurement values and the radio map DB which is referred to by the respective particle 320 is completed, the processor 200 normalizes a weighted sum of all the particles 320 to be 1 by performing a weighted sum on the similarities.

Subsequently, the processor 200 calculates characteristic values of the particles 320 on the basis of the positioning infrastructure measurement values and the radio map DB which is referred to by the particles 320. The processor 200 calculates the center of gravity of the particles 320 using the characteristic values of the particles 320. The processor 200 generates a direction vector for each particle 320 on the basis of the center of gravity of the particles 320 for particle resampling (S400).

Subsequently, the particle resampling is performed to generate new particles 320 in proportion to calculated weights. Through the particle resampling, the particles 320 with low weights are regarded as being irrelevant to a current location of the user and are destroyed, and the particles 320 with high weights are regarded as having a close relation with the current location of the user and are divided into more particles 320 at locations of the existing particles 320.

In this case, the processor 200 performs particle resampling according to the direction vector of each particle 320.

In the case of performing resampling on the particle using the direction vector, the particle 320 is divided at an actual location of the terminal, and thus a time required for convergence may be reduced.

A process of generating direction vectors of particles 320, performing resampling on the basis of the generated direction vectors, and finally estimating an indoor location will be described with reference to FIGS. 3 to 12.

Figure 3:
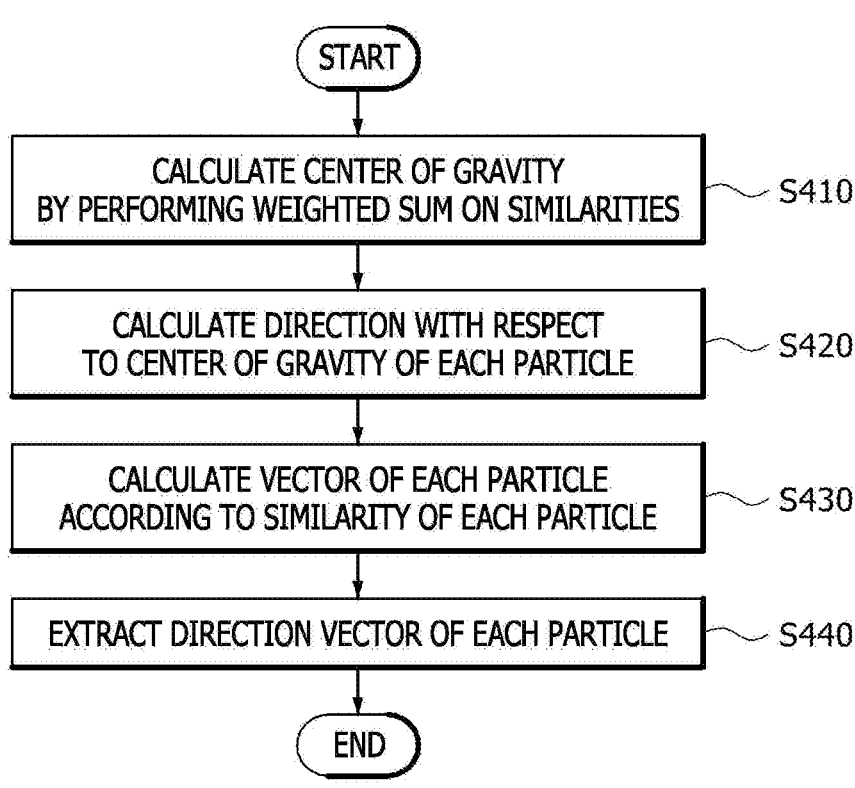
FIG. 3 is a flowchart of a method of generating direction vectors of particles according to an embodiment of the present invention.

FIG. 3 is a flowchart of a method of generating direction vectors of particles according to an embodiment of the present invention, and FIGS. 4 to 12 are views showing a process of generating the direction vectors of the particles according to the embodiment of the present invention.

Referring to FIG. 3, a processor 200 selects an area 310 including one or more particles 320.

The area 310 may include one or more particles 320 within a service area.

The processor 200 calculates characteristic values of the particles 320.

The characteristic values are similarities between positioning infrastructure measurement values and a radio map DB which is referred to by the particles 320.

That is, the processor 200 calculates the similarities between the positioning infrastructure measurement values and the radio map DB which is referred to by the particles 320, and performs a weighted sum on the similarities to calculate the center of gravity of the particles 320 (S410).

Figure 4:
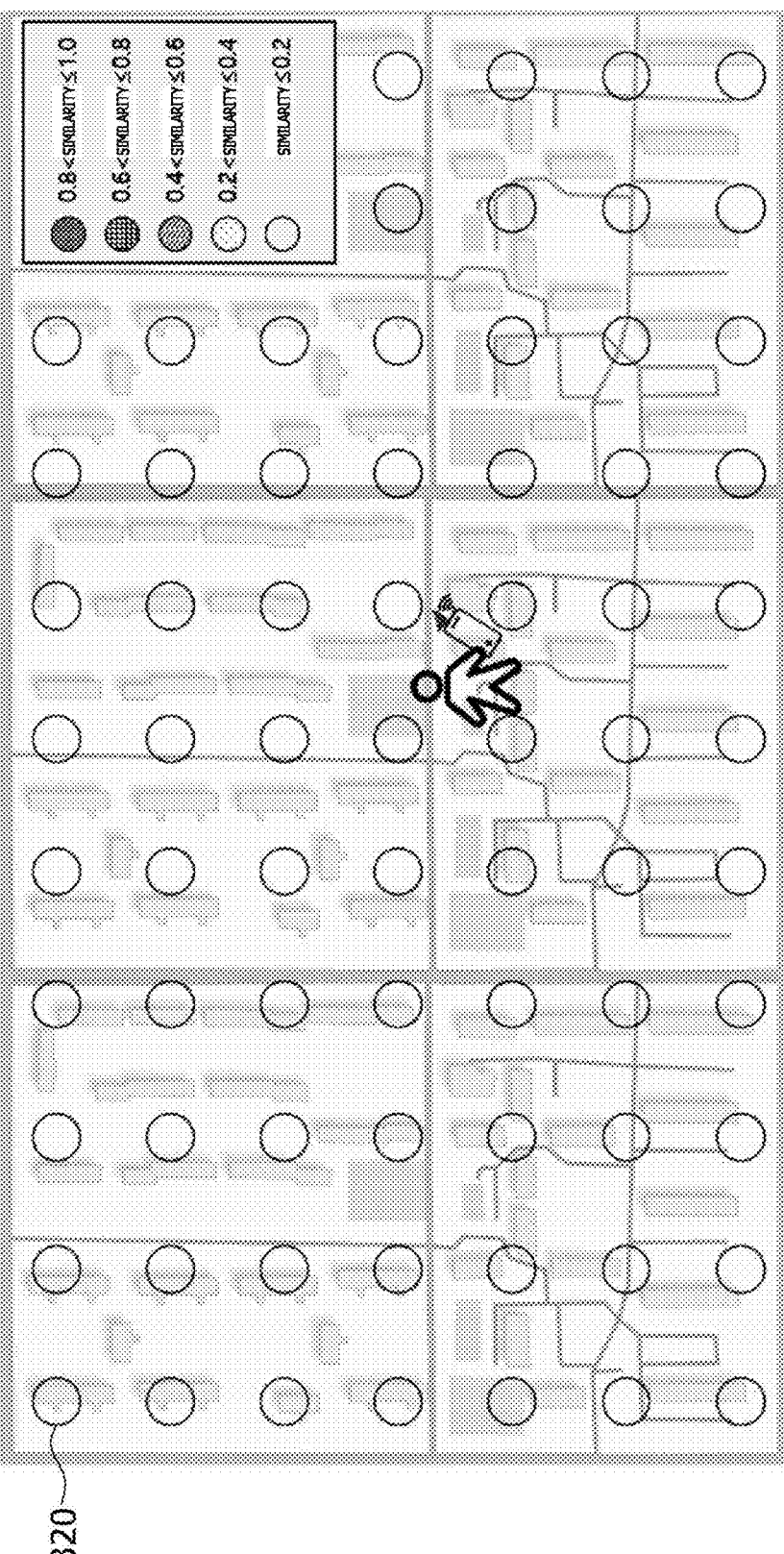
FIGS. 4 to 12 are views showing a process of generating direction vectors of particles according to an embodiment of the present invention.

FIG. 4 shows a result of setting random particles 320 for a corresponding area assuming a situation in which a user carrying a terminal does not move.

Figure 5:
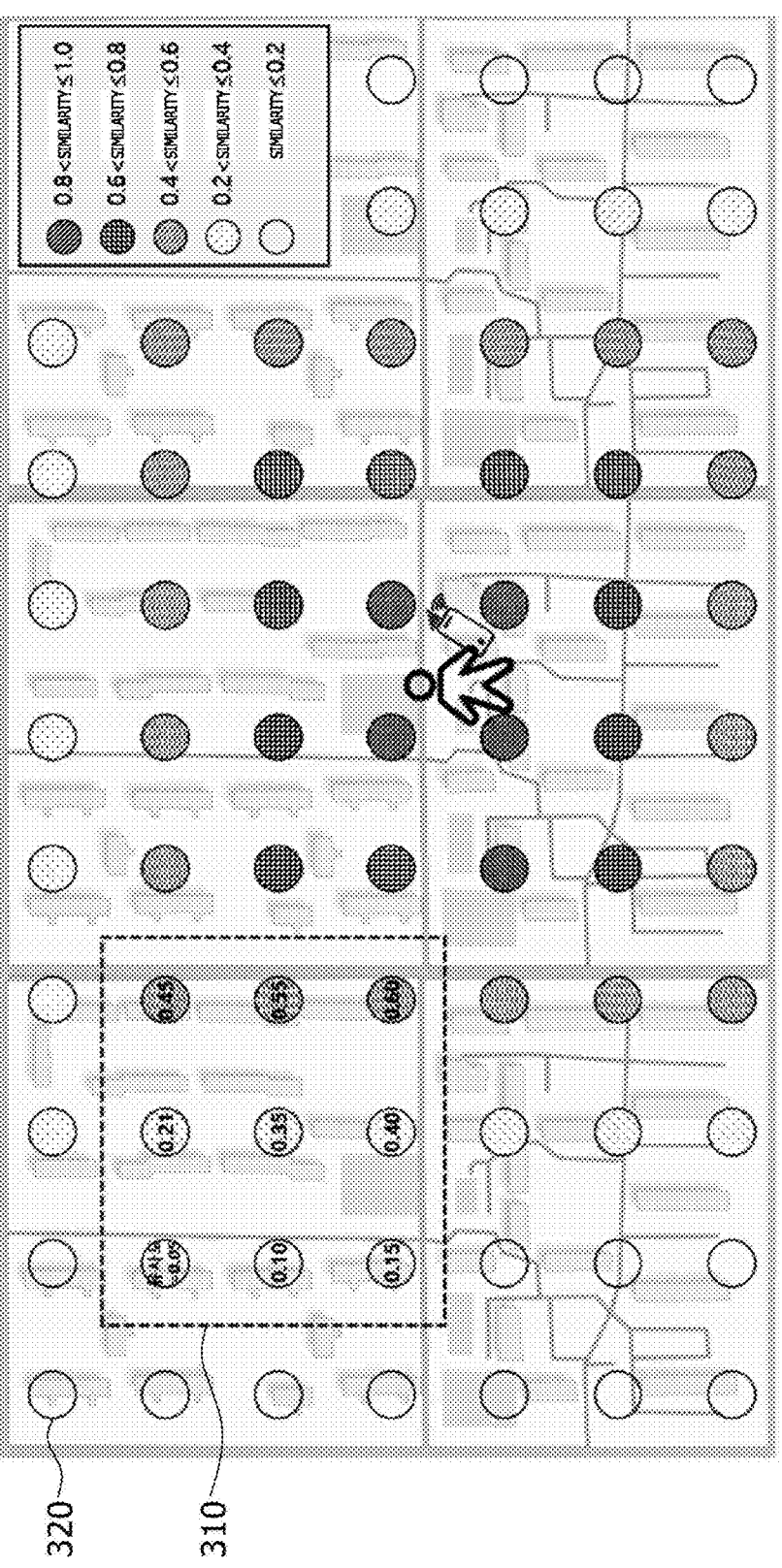

FIG. 5 shows a result of displaying, by the processor 200, the similarity between the positioning infrastructure measurement value and the radio map DB which is referred to by each particle 320 on the particle 320.

Referring to FIG. 5, it can be seen that the particle 320 closer to a location of the terminal has a high similarity. When it is assumed that nine particles 320 form a cluster in an upper left area (dotted-line rectangle) 310 and the similarities of the particles 320 are equal to values indicated in the particles 320, the processor 200 performs a weighted sum on the similarities to calculate the center of gravity of the particles 320 using Equation 1 below.

$$P_{w_{sum}}(x, y) = \left( \frac{\sum_{i=1}^{n} w_i \cdot P_x}{\sum_{i=1}^{n} w_i}, \frac{\sum_{i=1}^{n} w_i \cdot P_y}{\sum_{i=1}^{n} w_i} \right) \qquad \text{[Equation 1]}$$

In Equation 1, $P_{w_{sum}}$ denotes a location of the center of gravity calculated by performing the similarities of the particles 320 within the area 310, $w_i$ denotes the similarity of each particle 320, and $P_x$ and $P_y$ denote the locations of the particles 320. i corresponds to each particle 320, and n is 9 as a total number of the particles 320 within the area 310.

Figure 6:
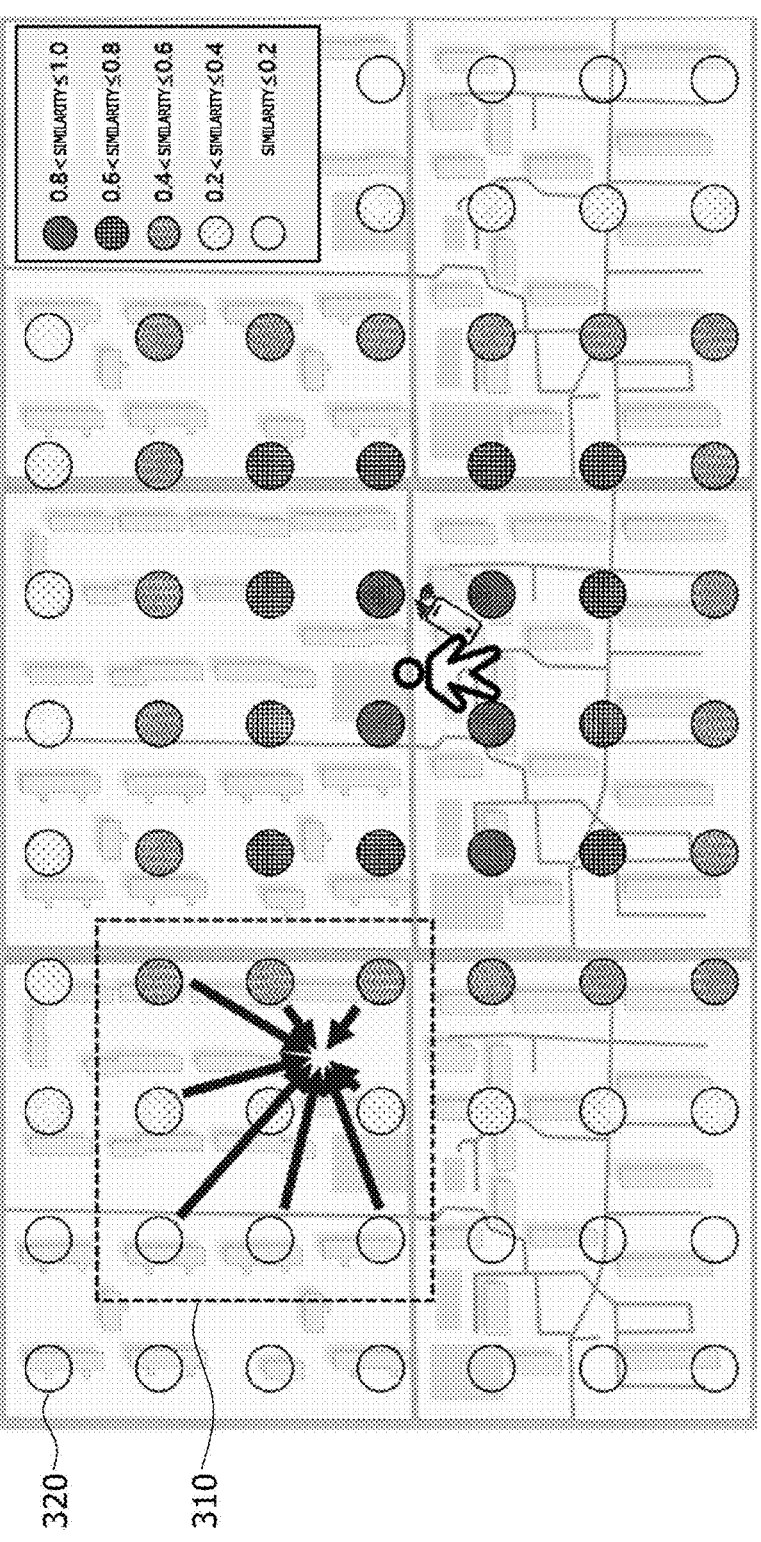

FIG. 6 shows directions of the respective particles 320 with respect to the center of gravity.

The processor 200 calculates the directions with respect to the center of gravity using Equation 2 below (S420).

$$\vec{v}_{P_i} = P_{w_{sum}}(x, y) - P_i \qquad \text{[Equation 2]}$$

In Equation 2, $$\vec{v}_{P_i}$$

denotes the direction of each particle 320 with respect to the center $P_{W_{sum}}$ (x,y) of gravity, and $P_i$ denotes a location of each particle 320.

When a similarity is low, a size of a vector should be large, and when the similarity is high, the size of the vector should be small (when the size of the vector is large, particles are moved farther in a corresponding direction when divided, and when the size of the vector is small, the particles are not moved as far in the corresponding direction when divided), and thus the vector reflecting the moving distance may be calculated using Equation 3 below (S430).

$$\vec{v}'_{P_i} = \frac{\vec{v}_{P_i}}{|\vec{v}_{P_i}|} \times \frac{\max\limits_n w_i}{w_i} \qquad \text{[Equation 3]}$$

In Equation 3, $$\vec{v}'_{P_i}$$

denotes the vector of the center of gravity and each particle 320, $$\frac{\vec{v}_{P_i}}{|\vec{v}_{P_i}|}$$

denotes a direction vector of each particle 320 which is directed toward the center of gravity, and $\max_n w_i$ denotes a maximum value of the similarities of the particles 320 within the area 310. $w_i$ denotes the similarity of the particle 320 to be obtained. Here, $$\frac{\max\limits_n w_i}{w_i}$$

is a size of the vector of the particles 320 and denotes a magnitude of a displacement to which the corresponding particle 320 should be moved.

That is, the processor 200 calculates the direction vector of the particle 320 which is directed toward the center of gravity on the basis of the vector between the center of gravity and each particle 320 (S440).

According to Equation 3, since the vector reflecting the moving distance is expressed by multiplying the normalized direction vector by the reciprocal of the similarity of the particle 320 relative to the maximum similarity, the lower the similarity of the particle 320 relative to the maximum similarity, the larger the size of the direction vector, and the higher the similarity of the particle 320, the smaller the size of the direction vector.

In addition, the processor 200 obtains the direction vectors of the particles 320 by summing the direction vectors of the particles 320 and direction vectors calculated from one or more clusters.

Figure 7:
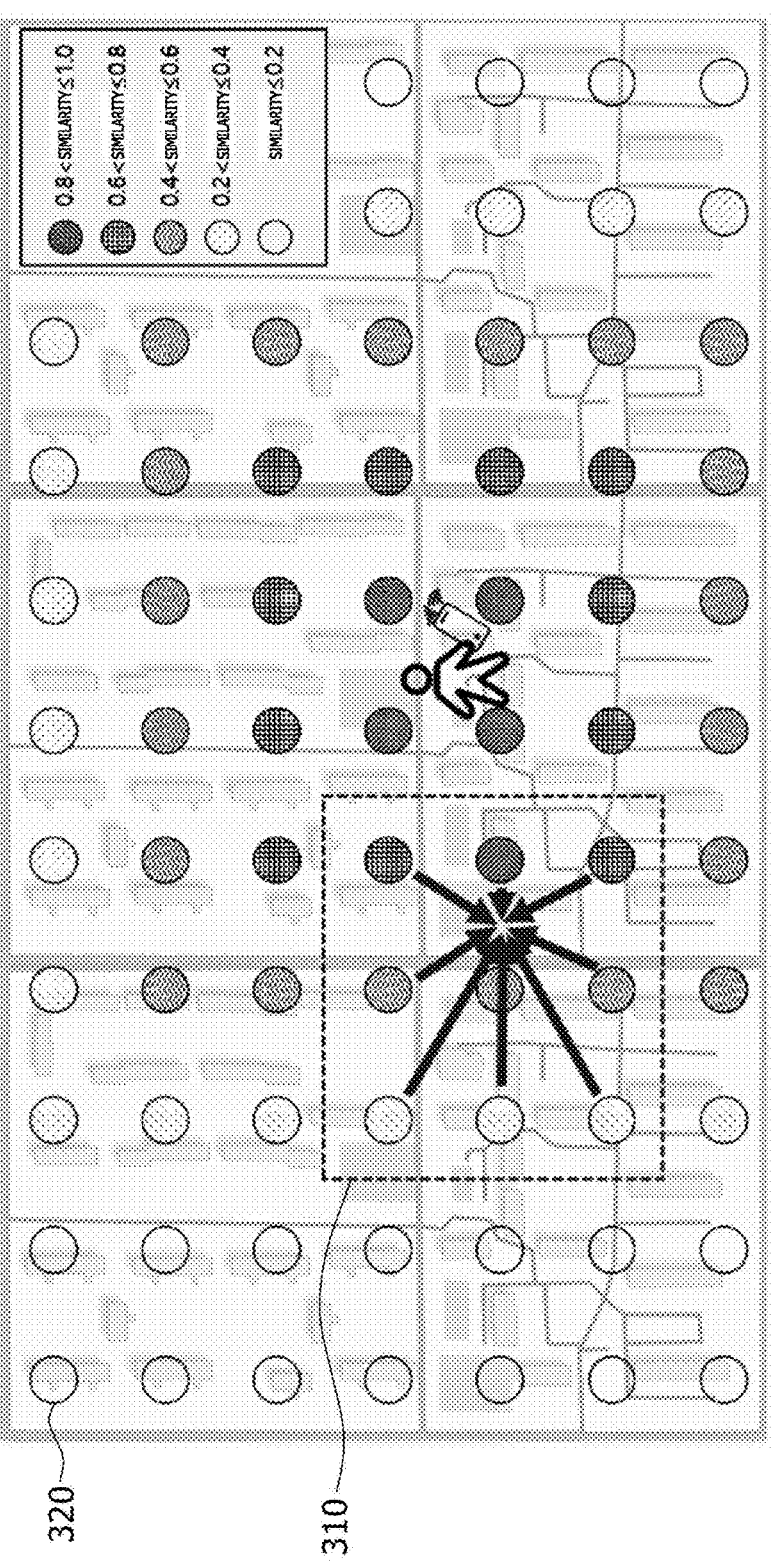

Meanwhile, when the processor 200 calculates the direction vectors of the particles 320, the processor 200 may use several areas 310 in order to reduce an error and accurately calculate the direction vectors of the particles 320. The areas 310 may be formed in a quadrangular shape. FIG. 7 shows a process of calculating the direction vectors using the areas 310.

Further, in the case in which the particles 320 have two or more direction vectors, the processor 200 may sum these direction vectors and express these direction vectors as one direction vector.

Figure 8:
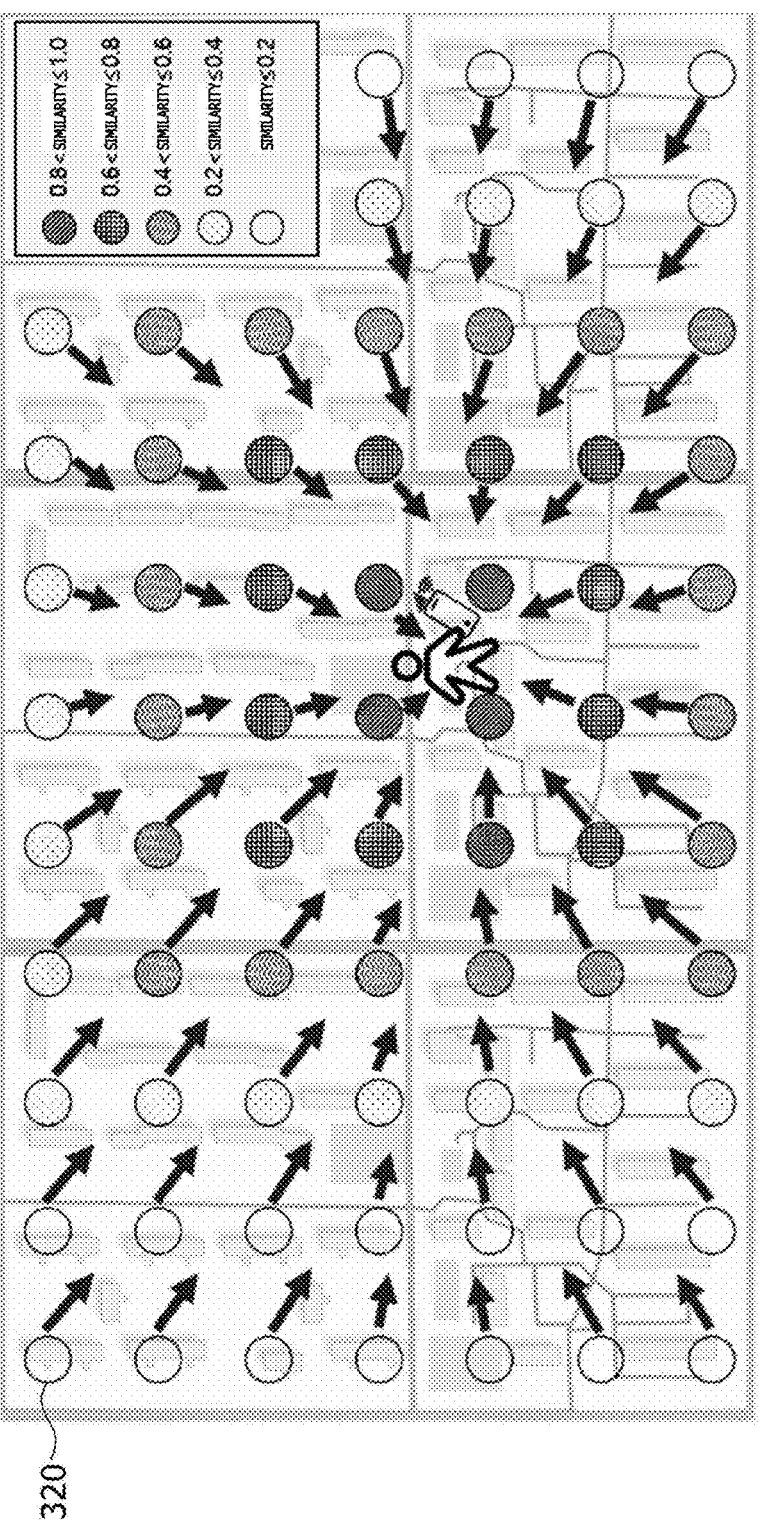

FIG. 8 shows final direction vectors of the respective particles 320 obtained through the process of calculating the direction vectors described above.

In FIG. 2, when the direction vectors of the respective particle 320 are calculated, the processor 200 performs particle resampling using the direction vectors of the particles 320 (S500).

The particle resampling is performed to generate new particles 320 in proportion to calculated weights. In this process, the processor 200 regards the particles 320 with low weights as being irrelevant to the current location of the user and destroys the particles 320.

On the other hand, the processor 200 regards the particles 320 with high weights as having a close relation with the current location of the user and divides the existing particles 320 into more particles 320. In this case, the processor 200 moves or divides the particles 320 according to the direction vectors of the respective particles 320.

For example, the processor 200 determines moving directions of the particles 320 according to the direction vectors of the particles 320 or determines moving distances of the particles 320 according to the sizes of the direction vectors to move or divide the particles 320 according to the determined directions and distances.

Figure 9:
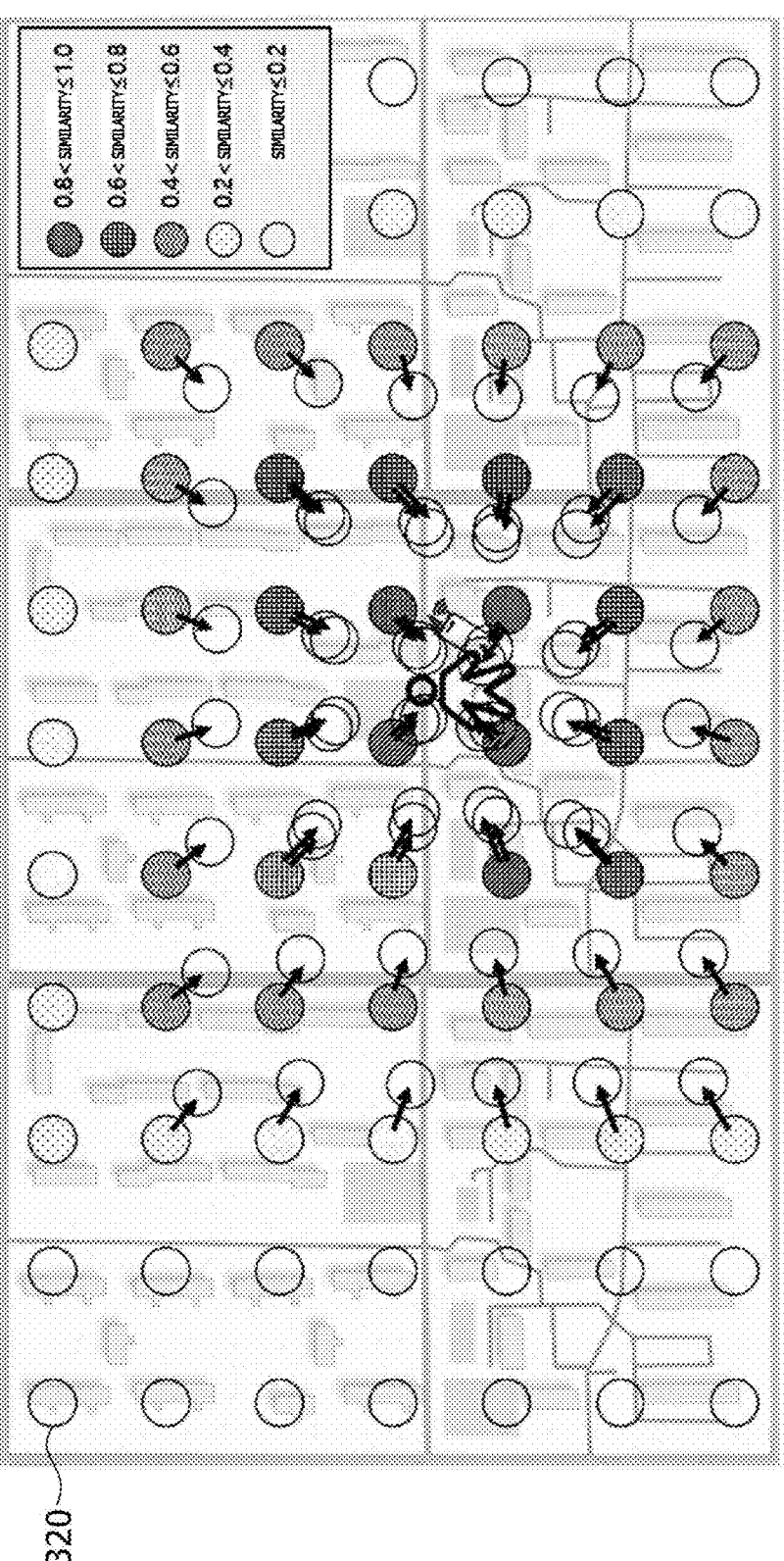

FIG. 9 shows a state in which the respective particles 320 are divided in the directions around the terminal using the direction vectors of the respective particles 320 after particle resampling is performed.

Figure 10:
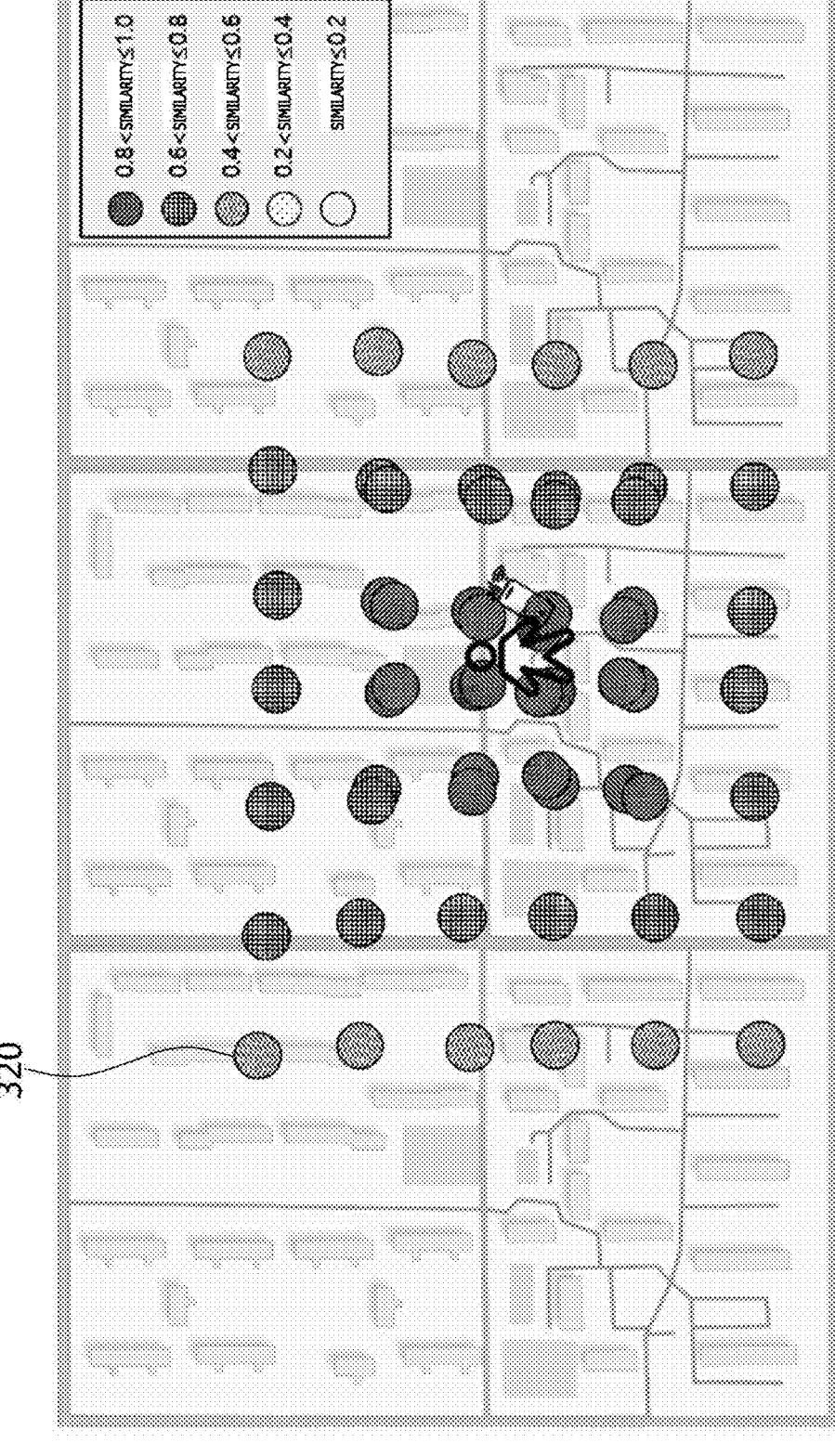

In this way, as the respective particles 320 are divided in the directions around the terminal using the direction vectors of the respective particles 320, in FIG. 10, it can be seen that the respective particles 320 are not divided at arbitrary locations and approach the vicinity of the terminal.

Meanwhile, when a new positioning infrastructure measurement value is additionally received, the processor 200 may place the particles 320 closer to the vicinity of the terminal through resampling.

The processor 200 may receive a new positioning infrastructure measurement value when an event in which the user moves occurs. When the event in which the user moves occurs, the processor 200 may additionally move or divide the respective particles 320 according to the direction vectors described above.

Figure 11:
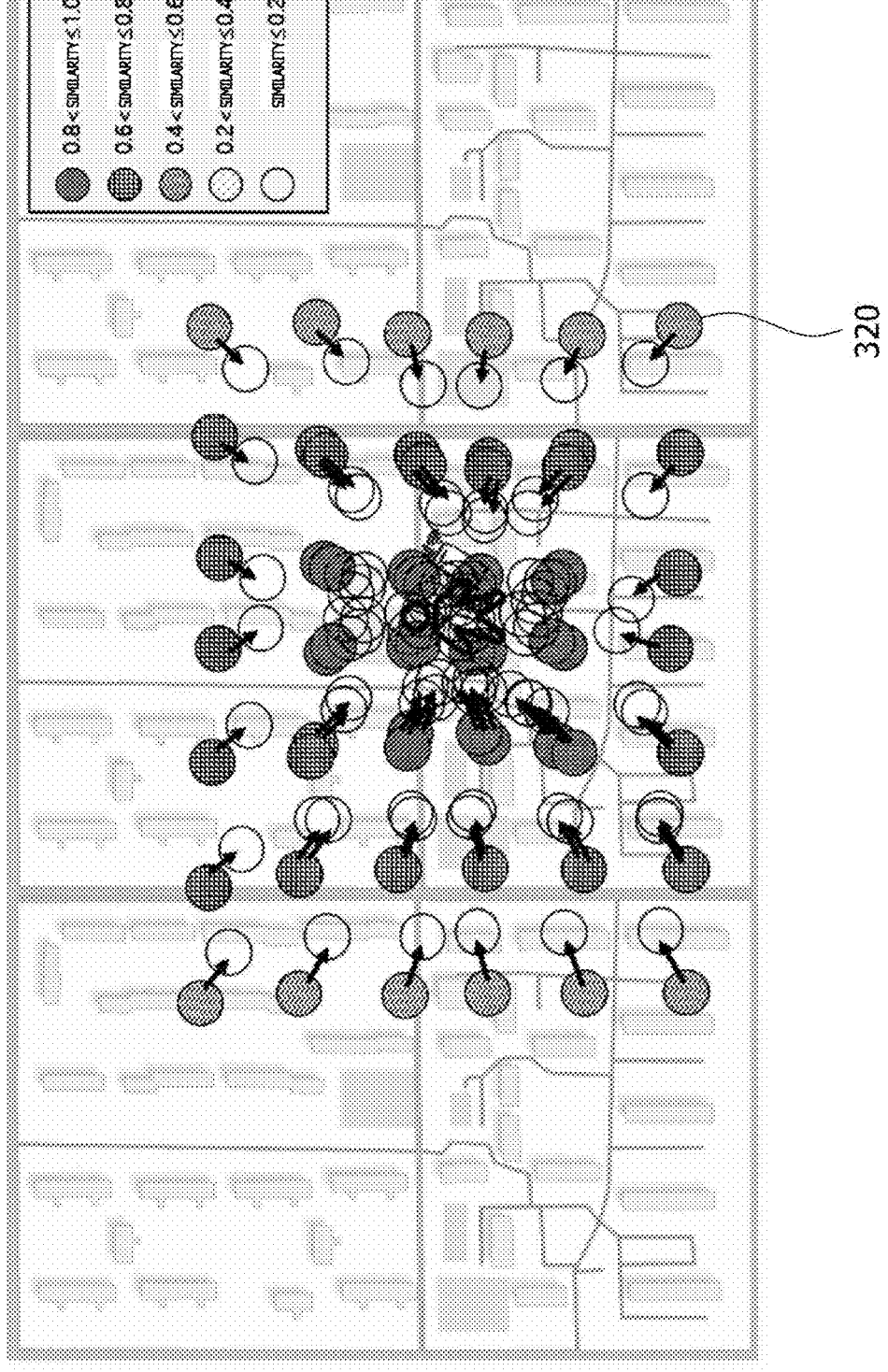
Figure 12:
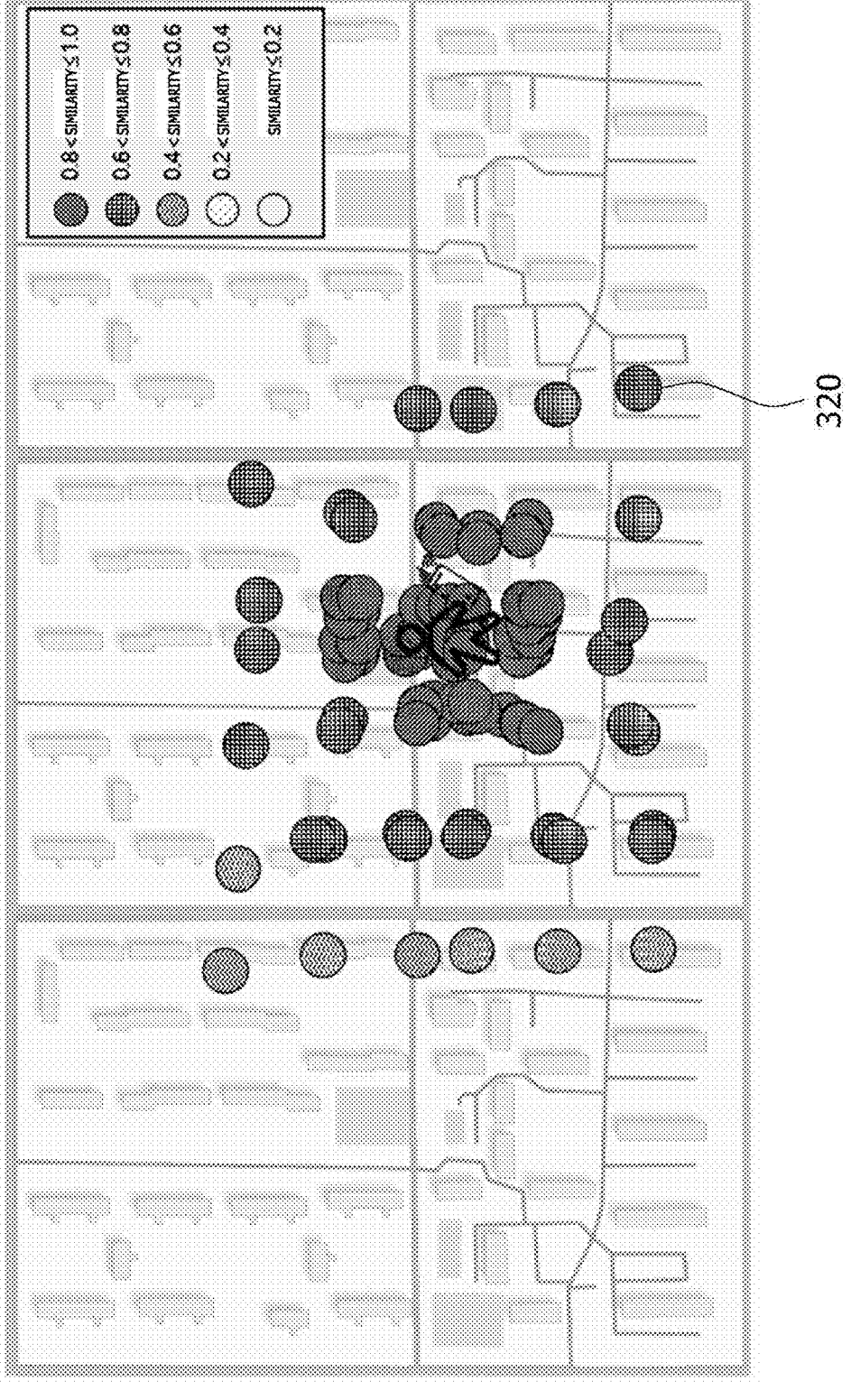

FIG. 11 shows a result of additionally receiving a new measurement value and performing similarity calculation and particle resampling, and FIG. 12 shows a state in which the particles 320 are gathered closer to the terminal.

In this way, by performing the particle resampling on the respective particles 320 on the basis of the direction vectors of the respective particles 320, the respective particles 320 are more rapidly and accurately gathered around the terminal.

Meanwhile, as described above, by performing the particle resampling, the processor 200 multiplies the locations of the particles 320 in operation by weights and then adds all results obtained by multiplying the locations by the weights to estimate a location of the user (S600).

According to the present invention, in the method of generating the direction vector of the particle and the apparatus and method for estimating the indoor location based thereon, it is possible to generate information on direction vectors for each particle to be divided or moved on the basis of similarities between positioning infrastructure measurement values and a radio map DB which is referred to by the particles, and perform resampling on the particles on the basis of the information to accurately and effectively estimate an indoor location.

Further according to the present invention, in the method of generating the direction vector of the particle and the apparatus and method for estimating the indoor location based thereon, it is possible to improve the accuracy of estimation of an indoor location by reducing the number of particles divided in unnecessary directions and increasing the number of particles divided in directions close to a location of a terminal.

Further according to the present invention, in the method of generating the direction vector of the particle and the apparatus and method for estimating the indoor location based thereon, it is possible to estimate an indoor location even when location recognition for a terminal in a stationary state is required or even when the terminal does not have a sensor capable of obtaining information on a moving direction.

While the present invention has been described with reference to the embodiment illustrated in the accompanying drawings, the embodiment should be considered in a descriptive sense only, and it should be understood by those skilled in the art that various alterations and other equivalent embodiments may be made. Therefore, the scope of the present invention should be defined by only the following claims.

What is claimed is:

1. An apparatus for estimating an indoor location in a wireless communication environment, the apparatus comprising:

an interface unit configured to receive a positioning infrastructure measurement value from a terminal and a radio map database (DB) which is referred to by one or more particles in a cluster including the particles; and a processor configured to:

set a service area in which the particles form the cluster;

initialize the particles within the service area;

calculate characteristic values of the particles on the basis of the positioning infrastructure measurement values including wireless signal strength information from the terminal and the radio map DB which is referred to by the particles;

calculate a center of gravity of the particles using the characteristic values;

calculate direction vectors of the particles on the basis of the center of gravity;

perform resampling on the particles according to the direction vector of each particle to reduce convergence time of particle distribution toward a location of the terminal; and estimate an indoor location of the terminal based on a result of the resampling on the particles according to the direction vector of each particle.

2. The apparatus of claim 1, wherein the characteristic values include similarities between the positioning infrastructure measurement values and the radio map DB which is referred to by the particles.

3. The apparatus of claim 1, wherein the processor determines moving directions of the particles according to the direction vectors of the particles when the particles are moved or divided.

4. The apparatus of claim 1, wherein the processor determines moving distances of the particles according to a magnitude of a displacement of movement in which the particles are moved or divided.

5. A method of estimating an indoor location in a wireless communication environment, the method comprising:

receiving, by an interface unit, positioning infrastructure measurement values from a terminal and a radio map database (DB) which is referred to by a plurality of particles in a cluster including the particles;

setting a service area in which the particles form the cluster;

initializing the particles within the service area;

calculating, by a processor, characteristic values of the particles on the basis of the positioning infrastructure measurement values including wireless signal strength information from the terminal and the radio map DB which is referred to by the particles, calculating a center of gravity of the particles using the characteristic values, and calculating direction vectors of the particles on the basis of the center of gravity;

performing resampling on the particles according to the direction vector of each particle to reduce convergence time of particle distribution toward a location of the terminal; and estimating, by the processor, an indoor location of the terminal based on a result of the resampling on the particles according to the direction vector of each particle.

6. The method of claim 5, wherein the characteristic values include similarities between the positioning infrastructure measurement values and the radio map DB which is referred to by the particles.

7. The method of claim 5, wherein, in the estimating of the indoor location of the terminal, the processor determines moving directions of the particles according to the direction vectors of the particles when the particles are moved or divided.

8. The method of claim 5, wherein, in the estimating of the indoor location of the terminal, the processor determines moving distances of the particles according to a magnitude of a displacement of movement in which the particles are moved or divided.

9. A method of generating direction vectors of particles in a wireless communication environment, the method comprising:

receiving information on the particles corresponding to a radio map database (DB);

setting a service area in which the particles form a cluster;

initializing the particles within the service area;

calculating, by a processor, a center of gravity of the particles on the basis of characteristic values of one or more particles in the cluster including the particles;

generating, by the processor, direction vectors of the particles on the basis of the center of gravity; and performing resampling on the particles according to the direction vector of each particle to reduce convergence time of particle distribution toward a location of the terminal.

10. The method of claim 9, wherein the characteristic values include similarities between positioning infrastructure measurement values and a radio map database (DB) which is referred to by the particles.

11. The method of claim 10, wherein, in the calculating of the center of gravity of the particles, the processor calculates the center of gravity by performing a weighted sum on the similarities.

12. The method of claim 10, wherein, in the generating of the direction vectors of the particles, the processor calculates the direction vectors on the basis of directions of the particles with respect to the center of gravity.

13. The method of claim 10, wherein, in the generating of the direction vectors of the particles, the processor obtains the direction vectors of the particles by summing the direction vectors of the particles and direction vectors calculated from at least one cluster.

14. The method of claim 10, further comprising, in the generating of the direction vectors of the particles, calculating, by the processor, a magnitude of a displacement to which the particle should be moved using a maximum value of the similarities of the particles in the cluster and using the similarities of the particles.

15. The method of claim 9, wherein, in the generating of the direction vectors of the particles, when the particle has a plurality of direction vectors, the processor sums the plurality of direction vectors.

\* \* \* \* \*